(12) United States Patent
Gong et al.

(10) Patent No.: US 11,606,295 B2
(45) Date of Patent: *Mar. 14, 2023

(54) SEARCH APPARATUS AND METHOD

(71) Applicant: Huawei Technologies Co., Ltd., Shenzhen (CN)

(72) Inventors: Jun Gong, Beijing (CN); Shuying Liu, Shenzhen (CN); Jing Hu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/850,610

(22) Filed: Apr. 16, 2020

(65) Prior Publication Data

US 2020/0244578 A1 Jul. 30, 2020

Related U.S. Application Data

(63) Continuation of application No. 15/337,329, filed on Oct. 28, 2016, now Pat. No. 10,812,382, which is a continuation of application No. PCT/CN2014/076667, filed on Apr. 30, 2014.

(51) Int. Cl.
*H04L 45/74* (2022.01)
*H04L 45/745* (2022.01)

(52) U.S. Cl.
CPC .......... *H04L 45/742* (2013.01); *H04L 45/745* (2013.01)

(58) Field of Classification Search
CPC .......................... H04L 45/742; H04L 45/745
See application file for complete search history.

(56) References Cited

U.S. PATENT DOCUMENTS 6,580,712 B1 6/2003 Jennings et al.
6,678,269 B1 1/2004 Michels et al.
6,810,037 B1 10/2004 Kalapathy et al.
(Continued)

FOREIGN PATENT DOCUMENTS

CN 1905523 A 1/2007
CN 101241499 A 8/2008
(Continued)

OTHER PUBLICATIONS

Cavium, "Neuron Search Processor Overview for Huawei," Cavium Networks Confidential, Nov. 2012, 27 pages.
(Continued)

*Primary Examiner* — Alford W Kindred
*Assistant Examiner* — Tiffany Thuy Bui
(74) *Attorney, Agent, or Firm* — Slater Matsil, LLP

(57) ABSTRACT

This application provides a search apparatus, including a global dispatcher, a global arbiter, and N search engines. The N search engines can access a first search table. The global dispatcher is configured to: determine that a first search keyword is corresponding to the first search table and dispatch the first search keyword to the N search engines. Each search engine is configured to: search, according to a first search algorithm, one subtable to determine whether an entry that matches the first search keyword exists; and output a search result to the global arbiter. The global arbiter is configured to arbitrate the search result output by each search engine, to obtain a search result corresponding to the first search table.

41 Claims, 6 Drawing Sheets

(56) References Cited

U.S. PATENT DOCUMENTS

| | | | |
|---|---|---|---|
| 6,954,823 B1 | 10/2005 | James et al. |
| 6,957,272 B2 | 10/2005 | Tallegas et al. |
| 7,071,711 B2 | 7/2006 | Bauer et al. |
| 7,099,325 B1 | 8/2006 | Kaniz et al. |
| 7,529,746 B2 | 5/2009 | Ichiriu et al. |
| 7,571,156 B1 | 8/2009 | Gupta et al. |
| 7,668,890 B2 | 2/2010 | Waters et al. |
| 7,685,191 B1 | 3/2010 | Zwicky et al. |
| 7,895,213 B2 | 2/2011 | Richardson |
| 7,953,721 B1 | 5/2011 | Depelteau et al. |
| 7,987,205 B1 | 7/2011 | Depelteau |
| 8,018,944 B1 | 9/2011 | Kopelman et al. |
| 8,321,399 B2 | 11/2012 | Teufel et al. |
| 8,599,853 B2 | 12/2013 | Chidambaram |
| 8,959,077 B2 | 2/2015 | Shen et al. |
| 9,251,202 B1* | 2/2016 | Uszkoreit | G06F 16/3338 |
| 9,292,525 B2 | 3/2016 | Waters et al. |
| 2002/0073073 A1 | 6/2002 | Cheng |
| 2003/0028512 A1 | 2/2003 | Stensmo |
| 2004/0013113 A1 | 1/2004 | Singh et al. |
| 2004/0083336 A1 | 4/2004 | Stark et al. |
| 2004/0105442 A1 | 6/2004 | Ko et al. |
| 2004/0139071 A1 | 7/2004 | Lee et al. |
| 2004/0186828 A1* | 9/2004 | Yadav | G06F 16/951 |
| 2005/0018682 A1 | 1/2005 | Ferguson et al. |
| 2005/0076024 A1 | 4/2005 | Takatsuka et al. |
| 2005/0091443 A1 | 4/2005 | Hershkovich et al. |
| 2006/0036659 A1 | 2/2006 | Capriati et al. |
| 2006/0187918 A1 | 8/2006 | Smith et al. |
| 2006/0203721 A1 | 9/2006 | Hsieh et al. |
| 2006/0294297 A1 | 12/2006 | Gupta |
| 2007/0078822 A1* | 4/2007 | Cucerzan | G06F 16/951 |
| 2007/0124194 A1 | 5/2007 | Barnette, Jr. et al. |
| 2009/0019030 A1 | 1/2009 | Smolyanskiy |
| 2009/0210412 A1* | 8/2009 | Oliver | G06F 7/02 |
| 2009/0222426 A1* | 9/2009 | Koch | G06F 16/951 |
| 2010/0106712 A1* | 4/2010 | Mizutani | G06F 16/13 |
| | | | 707/715 |
| 2010/0153436 A1 | 6/2010 | Teufel et al. |
| 2010/0316051 A1 | 12/2010 | Song et al. |
| 2011/0191312 A1* | 8/2011 | Gutlapalli | G06F 16/00 |
| | | | 707/706 |
| 2012/0204000 A1 | 8/2012 | Biran et al. |
| 2012/0290592 A1* | 11/2012 | Ishii | G06F 21/6227 |
| | | | 707/754 |
| 2014/0181071 A1 | 6/2014 | Pidduck et al. |
| 2014/0215478 A1 | 7/2014 | Goyal et al. |
| 2015/0078386 A1 | 3/2015 | Jackson et al. |
| 2016/0134954 A1 | 5/2016 | Fang et al. |
| 2017/0046444 A1 | 2/2017 | Gong et al. |

FOREIGN PATENT DOCUMENTS

| | | |
|---|---|---|
| CN | 101242362 A | 8/2008 |
| CN | 101505272 A | 8/2009 |
| CN | 101848248 A | 9/2010 |
| CN | 103401777 A | 11/2013 |
| CN | 103473237 A | 12/2013 |
| CN | 104012053 A | 8/2014 |

OTHER PUBLICATIONS

Mellanox Technologies, "NP-4™ Network Processor-100Gbps NPU for Carrier Ethernet Applications," Network Processor Product Brief, 2017, 3 pages.

Ronggao, Z., "The Study of Routing Lookup Algorithms for Prototype System of Network Processor," Thesis submitted in partial fulfillment of the requirements for the degree of Master of Engineering in Computer Science & Technology, Graduate School of National University of Defense Technology, Changsha, Hunan, P.R. China, Nov. 15, 2007, 71 pages.

* cited by examiner

SEARCH APPARATUS AND METHOD

CROSS-REFERENCE TO RELATED APPLICATIONS

This application is a continuation of U.S. patent application Ser. No. 15/337,329, filed on Oct. 28, 2016, which is a continuation of International Application No. PCT/CN2014/076667, filed on Apr. 30, 2014, the disclosures of which are hereby incorporated by reference in their entireties.

TECHNICAL FIELD

This application relates to the computer field, and in particular, to a search apparatus and method.

BACKGROUND

An increase in a data volume, a rate, and a service category on the Internet and occurrence of requirements of quality of service (QoS for short) and deep packet inspection (DPI for short) impose a higher requirement on a search engine of a network apparatus (such as a router).

Currently, a network device needs to support multiple types of services, and the multiple types of services may be corresponding to multiple types of search algorithms. The network device includes multiple search engines, where each search engine is corresponding to one type of search algorithm. For example, a router may need to support forwarding of an Internet Protocol (IP for short) packet and forwarding of a Media Access Control (MAC for short) protocol packet. Forwarding of the IP packet is corresponding to a longest prefix match algorithm, and forwarding of the MAC packet is corresponding to an exact match algorithm. The router needs to include a search engine corresponding to the longest prefix match algorithm and a search engine corresponding to the exact match algorithm, where the search engine corresponding to the longest prefix match algorithm is used to access a routing table, and the search engine corresponding to the exact match algorithm is used to access a MAC protocol table. In the foregoing technical solution, the search engines are not flexible enough.

SUMMARY

Embodiments of this application provide a search apparatus and method, which is helpful in improving flexibility of a search engine.

According to a first aspect, a search apparatus is provided. The apparatus includes a global dispatcher, a global arbiter, and N search engines, where N is an integer greater than 1, the N search engines can access a first search table, each search engine can access only one subtable of the first search table, for any two subtables N1 and N2 of the first search table, any entry in the subtable N1 is different from any entry in the subtable N2, and the first search table is corresponding to a first search algorithm. The apparatus also includes the global dispatcher is configured to: determine that a first search keyword is corresponding to the first search table, determine that the first search table is corresponding to the N search engines, and dispatch the first search keyword to the N search engines. The apparatus also includes each search engine in the N search engines is configured to: search, according to the first search algorithm, the one subtable that is of the first search table and can be accessed by each search engine in the N search engines, to determine whether an entry that matches the first search keyword dispatched by the global dispatcher exists; and output a search result to the global arbiter. The apparatus also includes the global arbiter is configured to arbitrate the search result output by each search engine, to obtain a search result corresponding to the first search table.

In the foregoing technical solution, each search engine in N search engines can access one subtable of a first search table. Compared with the prior art in which one search engine is corresponding to one search table, by using the foregoing technical solution, flexibility of a search engine is improved.

In a first possible implementation manner of the first aspect, the apparatus further includes a memory, where the memory stores a correspondence between an identifier of the first search table and identifiers of the N search engines that store all subtables of the first search table; and the global dispatcher is specifically configured to determine, according to the identifier of the first search table and the correspondence between the identifier of the first search table and the identifiers of the N search engines, that the first search table is corresponding to the N search engines.

According to the first aspect or the first possible implementation manner of the first aspect, in a second possible implementation manner of the first aspect, the N search engines include at least one search engine, the at least one search engine includes a local dispatcher, a first search unit, a second search unit, and a local arbiter, the first search unit can access one subtable of the first search table, the second search unit can access a second search table or one subtable of a second search table, and the second search table is corresponding to a second search algorithm; the local dispatcher is configured to: receive the first search keyword dispatched by the global dispatcher, determine that the first search keyword is corresponding to the first search unit, and dispatch the first search keyword to the first search unit; the first search unit is configured to: search, according to the first search algorithm, the one subtable that is of the first search table and can be accessed by the first search unit, to determine whether an entry that matches the first search keyword exists; and output a search result to the local arbiter; and the local arbiter is configured to: arbitrate a search result output by a search unit in the at least one search engine, and output an arbitration result to the global arbiter.

According to the first aspect, the first possible implementation manner of the first aspect, or the second possible implementation manner of the first aspect, in a third possible implementation manner of the first aspect, the N search engines include a first search engine and a second search engine, a subtable that is of the first search table and can be accessed by the first search engine is a first subtable, and a subtable that is of the first search table and can be accessed by the second search engine is a second subtable; and the apparatus is further configured to adjust ranges of entries that can be accessed by the N search engines, where the subtable that is of the first search table and can be accessed by the first search engine is adjusted to a third subtable, the third subtable includes all entries, except a first entry, in the first subtable, the subtable that is of the first search table and can be accessed by the second search engine is adjusted to a fourth subtable, and the fourth subtable includes all entries in the second subtable and the first entry.

According to the first aspect, the first possible implementation manner of the first aspect, the second possible implementation manner of the first aspect, or the third possible implementation manner of the first aspect, in a fourth possible implementation manner of the first aspect, the global arbiter is further configured to send the search result corresponding to the first search table to the global dispatcher; the global dispatcher is further configured to store a mapping relationship between the search result corresponding to the first search table and the first search keyword; and the global dispatcher is further configured to: acquire a second search keyword, and determine, according to the mapping relationship between the search result corresponding to the first search table and the first search keyword, that a search result corresponding to the second search keyword is the search result corresponding to the first search table, where the second search keyword is equal to the first search keyword.

According to a second aspect, a search apparatus is provided. The apparatus includes a global dispatcher, a global arbiter, and N search engines, where N is an integer greater than 1, the N search engines include a first search engine, the first search engine can access a first search table or one subtable of a first search table, the first search table is corresponding to a first search algorithm, the first search engine can access a second search table or one subtable of a second search table, and the second search table is corresponding to a second search algorithm. The apparatus also includes the global dispatcher is configured to: determine that a first search keyword is corresponding to the first search table, determine that the first search table is corresponding to the first search engine, and dispatch the first search keyword to the first search engine. The apparatus also includes the first search engine is configured to: search, according to the first search algorithm, the first search table that can be accessed by the first search engine or the one subtable that is of the first search table and can be accessed by the first search engine, to determine whether an entry that matches the first search keyword dispatched by the global dispatcher exists, to obtain a search result corresponding to the first search keyword; and output the search result corresponding to the first search keyword to the global arbiter. The apparatus also includes the global dispatcher is further configured to: determine that a second search keyword is corresponding to the second search table, determine that the second search table is corresponding to the first search engine, and dispatch the second search keyword to the first search engine. The apparatus also includes the first search engine is further configured to: search, according to the second search algorithm, the second search table that can be accessed by the first search engine or the one subtable that is of the second search table and can be accessed by the first search engine, to determine whether an entry that matches the second search keyword dispatched by the global dispatcher exists, to obtain a search result corresponding to the second search keyword; and output the search result corresponding to the second search keyword to the global arbiter. The apparatus also includes the global arbiter is configured to receive the search result corresponding to the first search keyword and the search result corresponding to the second search keyword.

In the foregoing technical solution, a first search engine can access a first search table or one subtable of a first search table. In addition, the first search engine can access a second search table or one subtable of a second search table. Compared with the prior art in which one search engine can access only one search table, by using the foregoing technical solution, flexibility of a search engine is improved.

In a first possible implementation manner of the second aspect, the apparatus further includes a memory, where the memory is configured to: before the global dispatcher determines that the first search table is corresponding to the first search engine, store a correspondence between an identifier of the first search table and an identifier of the first search engine; and the global dispatcher is specifically configured to determine, according to the identifier of the first search table and the correspondence between the identifier of the first search table and the identifier of the first search engine, that the first search table is corresponding to the first search engine.

According to the second aspect and the first possible implementation manner of the second aspect, in a second possible implementation manner of the second aspect, the memory is further configured to: before the global dispatcher determines that the second search table is corresponding to the first search engine, store a correspondence between an identifier of the second search table and the identifier of the first search engine; and the global dispatcher is specifically configured to determine, according to the identifier of the second search table and the correspondence between the identifier of the second search table and the identifier of the first search engine, that the second search table is corresponding to the first search engine.

According to the second aspect, the first possible implementation manner of the second aspect, or the second possible implementation manner of the second aspect, in a third possible implementation manner of the second aspect, the first search engine includes a local dispatcher, a first search unit, a second search unit, and a local arbiter, the first search unit can access the first search table or one subtable of the first search table, and the second search unit can access the second search table or one subtable of the second search table; the local dispatcher is configured to: receive the first search keyword dispatched by the global dispatcher, determine that the first search keyword is corresponding to the first search unit, and dispatch the first search keyword to the first search unit; the first search unit is configured to: search, according to the first search algorithm, the first search table that can be accessed by the first search unit or the one subtable that is of the first search table and can be accessed by the first search unit, to determine whether an entry that matches the first search keyword exists; and output a search result to the local arbiter; the local arbiter is configured to arbitrate the search result output by the first search unit; the local dispatcher is further configured to: receive the second search keyword dispatched by the global dispatcher, determine that the second search keyword is corresponding to the second search unit, and dispatch the second search keyword to the second search unit; the second search unit is configured to: search, according to the second search algorithm, the second search table that can be accessed by the second search unit or the one subtable that is of the second search table and can be accessed by the second search unit, to determine whether an entry that matches the second search keyword exists; and output a search result to the local arbiter; and the local arbiter is further configured to arbitrate the search result output by the second search unit.

According to the second aspect, the first possible implementation manner of the second aspect, the second possible implementation manner of the second aspect, or the third possible implementation manner of the second aspect, in a fourth possible implementation manner of the second aspect, the N search engines further include a second search engine, the first search engine can access the first search table or a first subtable of the first search table, and the second search engine can access a second subtable of the first search table; and the apparatus is further configured to adjust a range of entries that can be accessed by the first search engine and a range of entries that can be accessed by the second search engine, where the range of the entries that can be accessed by the first search engine is adjusted from the first search table or the first subtable of the first search table to a third subtable of the first search table, the third subtable includes all entries, except a first entry, in the first subtable, the range of the entries that can be accessed by the second search engine is adjusted from the second subtable of the first search table to a fourth subtable of the first search table, and the fourth subtable includes all entries in the second subtable and the first entry.

According to a third aspect, a search method is provided. The method includes determining, by a global dispatcher, that a first search keyword is corresponding to a first search table, determining that the first search table is corresponding to N search engines, and dispatching the first search keyword to the N search engines, where N is an integer greater than 1, the N search engines can access the first search table, each search engine can access only one subtable of the first search table, for any two subtables N1 and N2 of the first search table, any entry in the subtable N1 is different from any entry in the subtable N2, and the first search table is corresponding to a first search algorithm. The method also includes searching, by each search engine in the N search engines according to the first search algorithm, the one subtable that is of the first search table and can be accessed by each search engine in the N search engines, to determine whether an entry that matches the first search keyword dispatched by the global dispatcher exists; and outputting a search result to a global arbiter. The method also includes arbitrating, by the global arbiter, the search result output by each search engine, to obtain a search result corresponding to the first search table.

In a first possible implementation manner of the third aspect, the determining, by the global dispatcher, that the first search table is corresponding to N search engines specifically includes: determining, according to an identifier of the first search table and a correspondence between the identifier of the first search table and identifiers of the N search engines, that the first search table is corresponding to the N search engines, where a memory stores the correspondence between the identifier of the first search table and the identifiers of the N search engines that store all subtables of the first search table.

According to the third aspect or the first possible implementation manner of the third aspect, in a second possible implementation manner of the third aspect, the N search engines include at least one search engine, the at least one search engine includes a local dispatcher, a first search unit, a second search unit, and a local arbiter, the first search unit can access one subtable of the first search table, the second search unit can access a second search table or one subtable of a second search table, and the second search table is corresponding to a second search algorithm. The method further includes: receiving, by the local dispatcher, the first search keyword dispatched by the global dispatcher, determining that the first search keyword is corresponding to the first search unit, and dispatching the first search keyword to the first search unit; searching, by the first search unit according to the first search algorithm, the one subtable that is of the first search table and can be accessed by the first search unit, to determine whether an entry that matches the first search keyword exists; and outputting a search result to the local arbiter; and arbitrating, by the local arbiter, a search result output by a search unit in the at least one search engine, and outputting an arbitration result to the global arbiter.

According to the third aspect, the first possible implementation manner of the third aspect, or the second possible implementation manner of the third aspect, in a third possible implementation manner of the third aspect, the N search engines include a first search engine and a second search engine, a subtable that is of the first search table and can be accessed by the first search engine is a first subtable, and a subtable that is of the first search table and can be accessed by the second search engine is a second subtable. The method further includes: adjusting ranges of entries that can be accessed by the N search engines, where the subtable that is of the first search table and can be accessed by the first search engine is adjusted to a third subtable, the third subtable includes all entries, except a first entry, in the first subtable, the subtable that is of the first search table and can be accessed by the second search engine is adjusted to a fourth subtable, and the fourth subtable includes all entries in the second subtable and the first entry.

According to the third aspect, the first possible implementation manner of the third aspect, the second possible implementation manner of the third aspect, or the third possible implementation manner of the third aspect, in a fourth possible implementation manner of the third aspect, the method further includes: sending, by the global arbiter, the search result corresponding to the first search table to the global dispatcher; storing, by the global dispatcher, a mapping relationship between the search result corresponding to the first search table and the first search keyword; and acquiring, by the global dispatcher, a second search keyword, and determining, according to the mapping relationship, stored by the global dispatcher, between the search result corresponding to the first search table and the first search keyword, that a search result corresponding to the second search keyword is the search result corresponding to the first search table, where the second search keyword is equal to the first search keyword.

According to a fourth aspect, a search method is provided. The method includes determining, by a global dispatcher, that a first search keyword is corresponding to a first search table, determining that the first search table is corresponding to a first search engine, and dispatching the first search keyword to the first search engine, where N search engines include the first search engine, N is an integer greater than 1, the first search engine can access the first search table or one subtable of the first search table, the first search table is corresponding to a first search algorithm, the first search engine can access a second search table or one subtable of a second search table, and the second search table is corresponding to a second search algorithm. The method also includes searching, by the first search engine according to the first search algorithm, the first search table that can be accessed by the first search engine or the one subtable that is of the first search table and can be accessed by the first search engine, to determine whether an entry that matches the first search keyword dispatched by the global dispatcher exists, to obtain a search result corresponding to the first search keyword; and outputting the search result corresponding to the first search keyword to a global arbiter. The method also includes determining, by the global dispatcher, that a second search keyword is corresponding to the second search table, determining that the second search table is corresponding to the first search engine, and dispatching the second search keyword to the first search engine. The method also includes searching, by the first search engine according to the second search algorithm, the second search table that can be accessed by the first search engine or the one subtable that is of the second search table and can be accessed by the first search engine, to determine whether an entry that matches the second search keyword dispatched by the global dispatcher exists, to obtain a search result corresponding to the second search keyword; and outputting the search result corresponding to the second search keyword to the global arbiter. The method also includes receiving, by the global arbiter, the search result corresponding to the first search keyword and the search result corresponding to the second search keyword.

In a first possible implementation manner of the fourth aspect, the method further includes: before the determining, by the global dispatcher, that the first search table is corresponding to a first search engine, storing, by a memory, a correspondence between an identifier of the first search table and an identifier of the first search engine; and the determining, by the global dispatcher, that the first search table is corresponding to a first search engine specifically includes: determining, by the global dispatcher according to the identifier of the first search table and the correspondence between the identifier of the first search table and the identifier of the first search engine, that the first search table is corresponding to the first search engine, where the identifier of the first search table and the correspondence between the identifier of the first search table and the identifier of the first search engine are stored by the memory.

According to the fourth aspect and the first possible implementation manner of the fourth aspect, in a second possible implementation manner of the fourth aspect, the method further includes: before the determining, by the global dispatcher, that the second search table is corresponding to the first search engine, storing, by the memory, a correspondence between an identifier of the second search table and the identifier of the first search engine; and the determining, by the global dispatcher, that the second search table is corresponding to the first search engine specifically includes: determining, by the global dispatcher according to the identifier of the second search table and the correspondence between the identifier of the second search table and the identifier of the first search engine, that the second search table is corresponding to the first search engine, where the identifier of the second search table and the correspondence between the identifier of the second search table and the identifier of the first search engine are stored by the memory.

According to the fourth aspect, the first possible implementation manner of the fourth aspect, or the second possible implementation manner of the fourth aspect, in a third possible implementation manner of the fourth aspect, the first search engine includes a local dispatcher, a first search unit, a second search unit, and a local arbiter, the first search unit can access the first search table or one subtable of the first search table, and the second search unit can access the second search table or one subtable of the second search table. The method further includes: receiving, by the local dispatcher, the first search keyword dispatched by the global dispatcher, determining that the first search keyword is corresponding to the first search unit, and dispatching the first search keyword to the first search unit; searching, by the first search unit according to the first search algorithm, the first search table that can be accessed by the first search unit or the one subtable that is of the first search table and can be accessed by the first search unit, to determine whether an entry that matches the first search keyword exists; and outputting a search result to the local arbiter; arbitrating, by the local arbiter, the search result output by the first search unit; receiving, by the local dispatcher, the second search keyword dispatched by the global dispatcher, determining that the second search keyword is corresponding to the second search unit, and dispatching the second search keyword to the second search unit; searching, by the second search unit according to the second search algorithm, the second search table that can be accessed by the second search unit or the one subtable that is of the second search table and can be accessed by the second search unit, to determine whether an entry that matches the second search keyword exists; and outputting a search result to the local arbiter; and arbitrating, by the local arbiter, the search result output by the second search unit.

According to the fourth aspect, the first possible implementation manner of the fourth aspect, the second possible implementation manner of the fourth aspect, or the third possible implementation manner of the fourth aspect, in a fourth possible implementation manner of the fourth aspect, the N search engines further include a second search engine, the first search engine can access the first search table or a first subtable of the first search table, and the second search engine can access a second subtable of the first search table. The method further includes: adjusting a range of entries that can be accessed by the first search engine and a range of entries that can be accessed by the second search engine, where the range of the entries that can be accessed by the first search engine is adjusted from the first search table or the first subtable of the first search table to a third subtable of the first search table, the third subtable includes all entries, except a first entry, in the first subtable, the range of the entries that can be accessed by the second search engine is adjusted from the second subtable of the first search table to a fourth subtable of the first search table, and the fourth subtable includes all entries in the second subtable and the first entry.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application. A person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of this application clearer, the following further describes this application in detail with reference to the accompanying drawings. Apparently, the described embodiments are merely some but not all of the embodiments of this application. All other embodiments obtained by a person of ordinary skill in the art based on the embodiments of this application without creative efforts shall fall within the protection scope of this application.

Multiple embodiments are provided in the following. A search apparatus is involved in each of the multiple embodiments. Herein, the search apparatuses in the multiple embodiments are collectively described. The search apparatus may be a processor, a printed circuit board (PCB for short), or a network apparatus. The processor may be an application-specific integrated circuit (ASIC for short) or a field programmable gate array (FPGA for short). The PCB may include the processor, and the PCB may be a line card (line card). The network apparatus may include the PCB, and the PCB may include the processor. The network apparatus may be a router, a network switch, a firewall, a load balancer, a base station, a data center, a packet transport network (PTN for short) apparatus, or a wavelength division multiplexing (WDM for short) apparatus.

Figure 1:
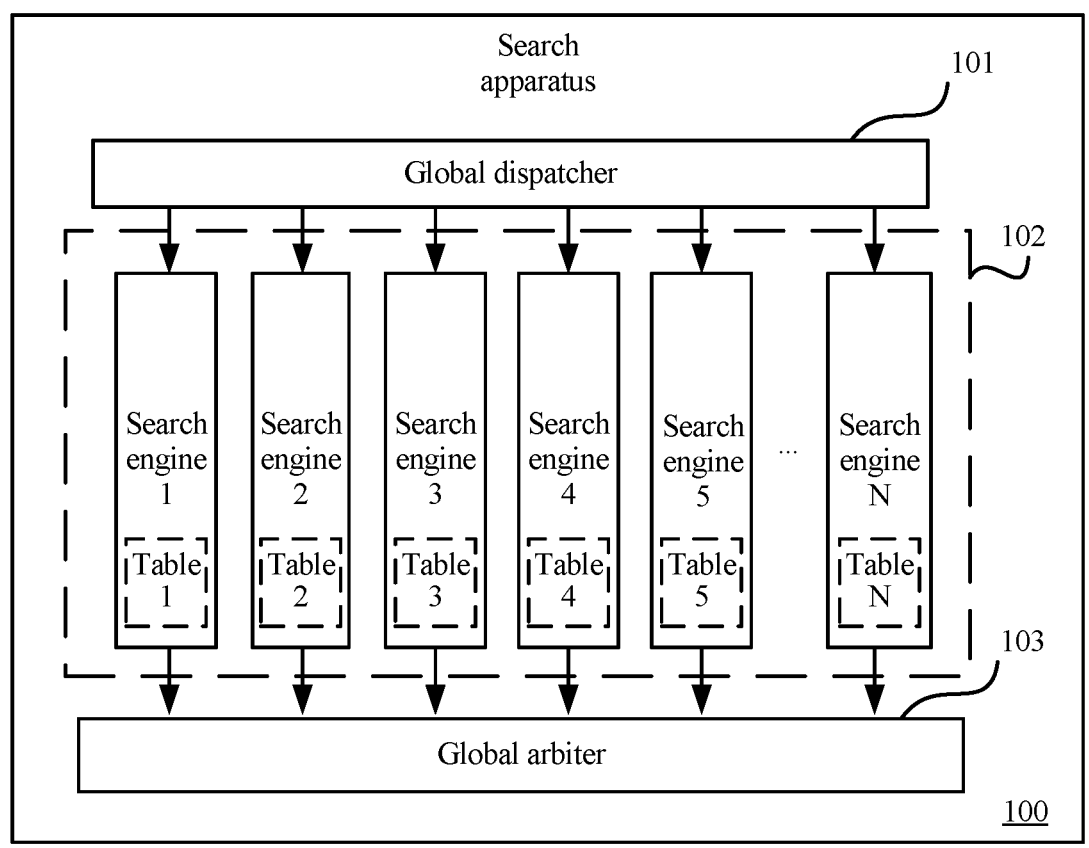
FIG. 1 is a schematic structural diagram of a search apparatus according to an embodiment of this application.

FIG. 1 is a schematic structural diagram of a search apparatus according to an embodiment of this application. Referring to FIG. 1, a search apparatus 100 includes a global dispatcher 101, N search engines 102, and a global arbiter 103. N is an integer greater than 1, for example, N may be 2 or 3. The N search engines 102 shown in FIG. 1 include a search engine 1, a search engine 2, a search engine 3, a search engine 4, a search engine 5, . . . , and a search engine N. It should be noted that the N search engines shown in FIG. 1 are used merely for illustration. In addition, the search apparatus 100 may further include another search engine in addition to the N search engines 102. The N search engines can access a first search table, where each search engine can access only one subtable of the first search table. For any two subtables N1 and N2 of the first search table, any entry in the subtable N1 is different from any entry in the subtable N2. The first search table is corresponding to a first search algorithm.

Specifically, the first search table includes N subtables. An entry in each subtable constitutes one set. An intersection set of two sets corresponding to any two subtables is an empty set.

For example, the first search table may be an access control list (ACL for short), a routing table, an incoming label map (ILM for short) table, a MAC protocol table, or a queue management (QM for short) table.

Each search engine in the N search engines 102 can access only one subtable of the first search table. For example, the first search table includes a table 1, a table 2, a table 3, a table 4, a table 5, . . . , and a table N. Referring to FIG. 1, the search engine 1 can access only the table 1, the search engine 2 can access only the table 2, the search engine 3 can access only the table 3, the search engine 4 can access only the table 4, the search engine 5 can access only the table 5, . . . , and the search engine N can access only the table N.

The global dispatcher 101 is configured to: determine that a first search keyword is corresponding to the first search table, determine that the first search table is corresponding to the N search engines 102, and dispatch the first search keyword to the N search engines 102.

For example, the global dispatcher 101 may receive signaling sent by a processing circuit. The signaling includes the first search keyword and an identifier of the first search table. The global dispatcher 101 may determine, according to the signaling, that the first search keyword is corresponding to the first search table. The processing circuit may be a parser, and the parser can parse a received packet to obtain the first search keyword. For example, the received packet may be an IP packet, and the first search keyword may be a destination IP address. In addition, the received packet may be an Ethernet frame, and the first search keyword may be a destination MAC protocol address.

For example, the global dispatcher 101 may access a mapping relationship between the identifier of the first search table and an identifier of each search engine in the N search engines 102, so as to determine that the first search table is corresponding to the N search engines 102.

For example, the global dispatcher 101 may dispatch the first search keyword to each search engine in the N search engines 102.

Each search engine in the N search engines 102 is configured to: search, according to the first search algorithm, the one subtable that is of the first search table and can be accessed by each search engine in the N search engines 102, to determine whether an entry that matches the first search keyword dispatched by the global dispatcher exists; and output a search result to the global arbiter.

For example, the first search algorithm may be a linear search algorithm, a longest prefix search algorithm, an exact search algorithm, or a mask search algorithm.

For example, the search engine 1 shown in FIG. 1 searches the table 1 to determine whether an entry that matches the first search keyword exists, the search engine 2 searches the table 2 to determine whether an entry that matches the first search keyword exists, . . . , and the search engine N searches the table N to determine whether an entry that matches the first search keyword exists.

For example, if an entry that matches the first search keyword exists in the subtable, the search result may be information in the entry that matches the first search keyword, or may be information indicated by an index in the entry that matches the first search keyword. For example, the information in the entry that matches the first search keyword or the information indicated by the index in the entry that matches the first search keyword may be a next-hop IP address. The index in the entry that matches the first search keyword may be an index of the next-hop IP address. In addition, the search result may further include information used to indicate that an entry that matches the first search keyword exists in the subtable. The information used to indicate that an entry that matches the first search keyword exists in the subtable may be match.

For example, if an entry that matches the first search keyword does not exist in the subtable, the search result may be information used to indicate that an entry that matches the first search keyword does not exist in the subtable. The information used to indicate that an entry that matches the first search keyword does not exist in the subtable may be missing.

The global arbiter 103 is configured to arbitrate the search result output by each search engine, to obtain a search result corresponding to the first search table.

The arbitration enables the search result corresponding to the first search table to be equal to a search result obtained by a search engine by searching the first search table according to the first search keyword and the first search algorithm.

For example, the first search algorithm is a longest prefix match algorithm. The first search keyword is an IP address, and the IP address may be 192.168.0.1. Values of match fields in entries that are in the table 1, the table 2, the table 3, and the table 4 and match the first search keyword are 192.*.*.*, a value of a match field in an entry that is in the table 5 and matches the first search keyword is 192.168.*.*, . . . , and a value of a match field in an entry that is in the table N and matches the first search keyword is 192.168.0.*. Search results output by the search engine 1 to the search engine 4 are 192.*.*.*, a search result output by the search engine 5 is 192.168.*.*, . . . , and a search result output by the search engine N is 192.168.0.*. The global arbiter 103 obtains, by means of arbitration, that the search result corresponding to the first search table is information in the entry that is in the table N and includes the match field whose value is 192.168.0.*.

For example, the first search algorithm is an exact match algorithm. The first search keyword is a MAC protocol address, and the MAC protocol address may be 00-00-00-00-00-00-00-E0. None of the table 1 to the table 5 includes an entry that includes a match field whose value is equal to 00-00-00-00-00-00-00-E0, and search results output by the search engine 1 to the search engine 5 are miss . . . . The table N includes the entry that includes the match field whose value is equal to 00-00-00-00-00-00-00-E0, and a search result output by the search engine N is match and information in the entry that is in the table N and includes the match field whose value is equal to 00-00-00-00-00-00-00-E0. The global arbiter 103 obtains, by means of arbitration, that the search result corresponding to the first search table is the information in the entry that is in the table N and includes the match field whose value is equal to 00-00-00-00-00-00-00-E0.

Optionally, the search apparatus 100 further includes a memory. The memory stores a correspondence between the identifier of the first search table and identifiers of the N search engines 102 that store all subtables of the first search table.

For example, the memory stores a table of mapping between the identifier of the first search table and the table 1 to the table N.

The global dispatcher 101 is specifically configured to determine, according to the identifier of the first search table and the correspondence between the identifier of the first search table and the identifiers of the N search engines 102, that the first search table is corresponding to the N search engines.

Figure 2:
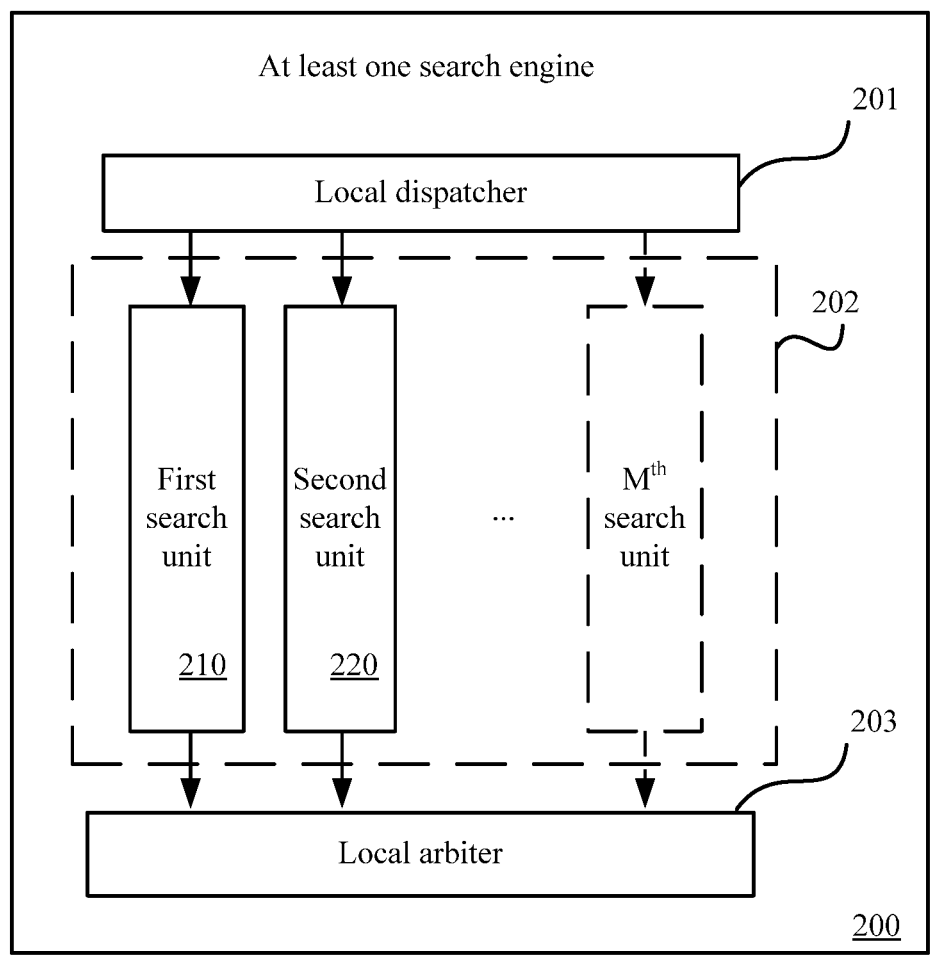
FIG. 2 is a schematic structural diagram of at least one search engine according to an embodiment of this application.

Optionally, the N search engines 102 shown in FIG. 1 include at least one search engine. FIG. 2 is a schematic structural diagram of the at least one search engine. Referring to FIG. 2, at least one search engine 200 includes a local dispatcher 201, multiple search units 202, and a local arbiter 203. The multiple search units 202 include a first search unit 210 and a second search unit 220. Optionally, the multiple search units 202 may further include another search unit. The another search unit may be an $M^{th}$ search unit, where M is an integer greater than 2. The first search unit 210 can access one subtable of the first search table. The second search unit 220 can access a second search table or one subtable of a second search table. The second search table is corresponding to a second search algorithm.

For example, architecture of at least one search unit in the multiple search units 202 is a pipeline-based static random access memory (pipeline-based SRAM). That is, the search unit may be configured in a pipeline structure. The pipeline structure includes static random access memories at multiple levels. A static random access memory at each level is configured to store a data structure of a to-be-searched table. The static random access memory at each level has a corresponding parsing unit. The parsing unit is configured to: access a data structure in the corresponding static random access memory, parse the data structure, and send a result obtained after parsing to a next-level pipeline. A search unit in a pipeline-based SRAM architecture may be configured to implement multiple types of search algorithms.

Specifically, a quantity of entries included in the second search table is greater than a quantity of entries included in one subtable of the second search table.

The local dispatcher 201 is configured to: receive the first search keyword dispatched by the global dispatcher 101, determine that the first search keyword is corresponding to the first search unit 210, and dispatch the first search keyword to the first search unit 210.

The first search unit 210 is configured to: search, according to the first search algorithm, the one subtable that is of the first search table and can be accessed by the first search unit 210, to determine whether an entry that matches the first search keyword exists; and output a search result to the local arbiter 203.

For example, the at least one search engine 200 shown in FIG. 2 may be the search engine 1 shown in FIG. 1. The one subtable that is of the first search table and can be accessed by the first search unit 210 may be the table 1.

The local arbiter 203 is configured to: arbitrate a search result output by a search unit in the at least one search engine 200, and output an arbitration result to the global arbiter 103.

For example, the search result output by the search unit in the at least one search engine 200 may include only the search result output by the first search unit 210, or the search result output by the search unit in the at least one search engine 200 may include the search result output by the first search unit 210 and a search result output by the second search unit 220. That is, the local arbiter 203 may arbitrate a search result output by only one search unit, or may arbitrate search results output by multiple search units.

Optionally, the N search engines 102 include a first search engine and a second search engine. A subtable that is of the first search table and can be accessed by the first search engine is a first subtable. A subtable that is of the first search table and can be accessed by the second search engine is a second subtable.

The search apparatus 100 is further configured to adjust ranges of entries that can be accessed by the N search engines 102, where the subtable that is of the first search table and can be accessed by the first search engine is adjusted to a third subtable, the third subtable includes all entries, except a first entry, in the first subtable, the subtable that is of the first search table and can be accessed by the second search engine is adjusted to a fourth subtable, and the fourth subtable includes all entries in the second subtable and the first entry.

The first entry may be one entry or multiple entries.

For example, the first search engine may be the search engine 1, the second search engine may be the search engine 2, the first subtable may be the table 1, and the second subtable may be the table 2. For example, a quantity of entries in the table 1 may be 100, and a quantity of entries in the table 2 may be 100. The search apparatus 100 adjusts the ranges of the entries that can be accessed by the N search engines 102, so that at least one entry in the table 1 is moved to the table 2. Specifically, after the search apparatus 100 adjusts a range of entries that can be accessed by a search engine, a range of entries that can be accessed by the search engine 1 is the third subtable, and a range of entries that can be accessed by the search engine 2 is the fourth subtable. A quantity of entries in the third subtables may be 99, and a quantity of entries in the fourth subtables may be 101; or certainly, a quantity of entries in the third subtables may be 0, and a quantity of entries in the fourth subtables may be 200. In addition, in this application, it is not limited that the at least one entry in the table 1 can be moved only to the table 2. For example, some entries in the at least one entry in the table 1 may be moved to the table 2, and the other entries in the at least one entry in the table 1 may be moved to another table (such as the table 3).

Optionally, the global arbiter 103 is further configured to send the search result corresponding to the first search table to the global dispatcher 101.

The global dispatcher 101 is further configured to store a mapping relationship between the search result corresponding to the first search table and the first search keyword.

For example, the global dispatcher 101 may include a storage circuit. The global dispatcher 101 may store the mapping relationship between the search result corresponding to the first search table and the first search keyword by using the storage circuit in the global dispatcher 101. Certainly, the global dispatcher 101 may store the mapping relationship between the search result corresponding to the first search table and the first search keyword by accessing a storage circuit outside the global dispatcher 101.

The global dispatcher is further configured to: acquire a second search keyword, and determine, according to the mapping relationship between the search result corresponding to the first search table and the first search keyword, that a search result corresponding to the second search keyword is the search result corresponding to the first search table, where the second search keyword is equal to the first search keyword.

For example, the second search keyword may be obtained by the parser by parsing a newly received IP packet.

Figure 3:
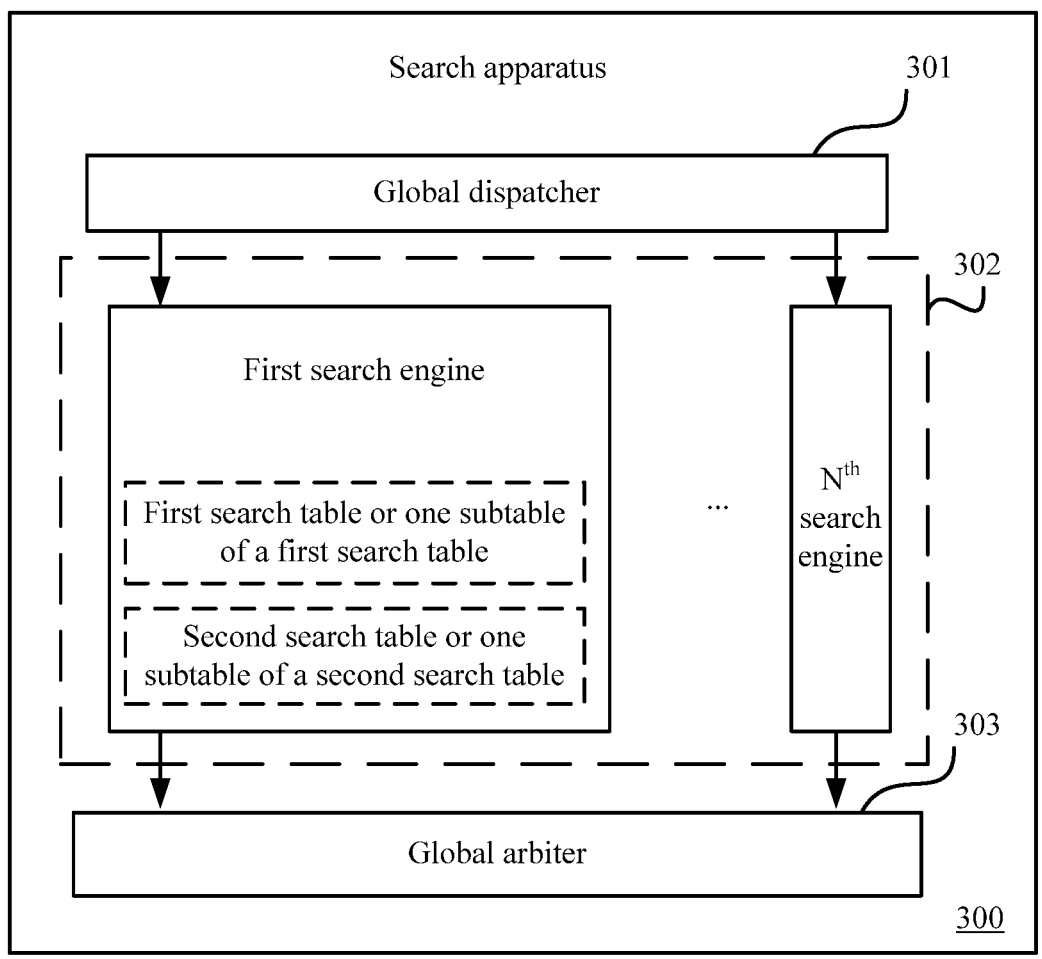
FIG. 3 is a schematic structural diagram of a search apparatus according to an embodiment of this application.

FIG. 3 is a schematic structural diagram of a search apparatus according to an embodiment of this application. Referring to FIG. 3, a search apparatus 300 includes a global dispatcher 301, N search engines 302, and a global arbiter 303. N is an integer greater than 1, for example, N may be 2 or 3. The N search engines 302 shown in FIG. 3 include a first search engine, . . . , and an $N^{th}$ search engine. It should be noted that the N search engines 302 shown in FIG. 3 are used merely for illustration. In addition, the search apparatus 300 may further include another search engine in addition to the N search engines 302. The first search engine can access a first search table or one subtable of a first search table. The first search table is corresponding to a first search algorithm. The first search engine can access a second search table or one subtable of a second search table. The second search table is corresponding to a second search algorithm.

For example, the first search table or the second search table may be an ACL, a routing table, an ILM table, a MAC protocol table, or a QM table. The first search table is different from the second search table.

For example, the first search algorithm or the second search algorithm may be a linear search algorithm, a longest prefix search algorithm, an exact search algorithm, or a mask search algorithm. The first search algorithm is different from the second search algorithm.

A quantity of entries in a subtable of the first search table is less than a quantity of entries in the first search table. A quantity of entries in a subtable of the second search table is less than a quantity of entries in the second search table.

For example, when the first search engine can access one subtable of the first search table, the $N^{th}$ search engine can access another subtable of the first search table. When the first search engine can access one subtable of the second search table, the $N^{th}$ search engine can access another subtable of the second search table.

The global dispatcher 301 is configured to: determine that a first search keyword is corresponding to the first search table, determine that the first search table is corresponding to the first search engine, and dispatch the first search keyword to the first search engine.

For example, the global dispatcher 301 may receive first signaling sent by a processing circuit. The first signaling includes the first search keyword and an identifier of the first search table. The global dispatcher 301 may determine, according to the first signaling, that the first search keyword is corresponding to the first search table. The processing circuit may be a parser, and the parser can parse a received first packet to obtain the first search keyword. For example, the first packet may be an IP packet, and the first search keyword may be a destination IP address. In addition, the first packet may be an Ethernet frame, and the first search keyword may be a destination MAC protocol address.

For example, when the first search engine can access the first search table, the global dispatcher 301 may access a mapping relationship between the identifier of the first search table and an identifier of the first search engine, so as to determine that the first search table is corresponding to the first search engine.

For example, when the first search engine can access one subtable of the first search table, the global dispatcher 301 may access a mapping relationship between the identifier of the first search table and identifiers of multiple search engines that store all subtables of the first search table, so as to determine that the first search table is corresponding to the first search engine. The first search table includes multiple subtables, where the multiple subtables of the first search table are in a one-to-one correspondence with the multiple search engines, and the multiple search engines include the first search engine.

The first search engine is configured to: search, according to the first search algorithm, the first search table that can be accessed by the first search engine or the one subtable that is of the first search table and can be accessed by the first search engine, to determine whether an entry that matches the first search keyword dispatched by the global dispatcher 301 exists, to obtain a search result corresponding to the first search keyword; and output the search result corresponding to the first search keyword to the global arbiter 303.

For example, if an entry that matches the first search keyword exists in the first search table or the one subtable of the first search table, the search result may be information in the entry that matches the first search keyword, or may be information indicated by an index in the entry that matches the first search keyword. For example, the information in the entry that matches the first search keyword or the information indicated by the index in the entry that matches the first search keyword may be a next-hop IP address. The index in the entry that matches the first search keyword may be an index of the next-hop IP address. In addition, the search result may further include information used to indicate that an entry that matches the first search keyword exists in the first search table or the one subtable of the first search table. The information used to indicate that an entry that matches the first search keyword exists may be match.

For example, if an entry that matches the first search keyword does not exist in the first search table or the one subtable of the first search table, the search result may be information used to indicate that an entry that matches the first search keyword does not exist in the first search table or the one subtable of the first search table. The information used to indicate that an entry that matches the first search keyword does not exist may be miss.

The global dispatcher 301 is further configured to: determine that a second search keyword is corresponding to the second search table, determine that the second search table is corresponding to the first search engine, and dispatch the second search keyword to the first search engine.

For example, the global dispatcher 301 may receive second signaling sent by the processing circuit. The second signaling includes the second search keyword and an identifier of the second search table. The global dispatcher 301 may determine, according to the second signaling, that the second search keyword is corresponding to the second search table. The processing circuit can parse a received second packet to obtain the second search keyword. For example, the second packet may be an IP packet, and the second search keyword may be a destination IP address. In addition, the second packet may be an Ethernet frame, and the second search keyword may be a destination MAC protocol address.

For example, when the first search engine can access the second search table, the global dispatcher 301 may access a mapping relationship between the identifier of the second search table and the identifier of the first search engine, so as to determine that the second search table is corresponding to the first search engine.

For example, when the first search engine can access one subtable of the second search table, the global dispatcher 301 may access a mapping relationship between the identifier of the second search table and identifiers of multiple search engines that store all subtables of the second search table, so as to determine that the second search table is corresponding to the first search engine. The second search table includes multiple subtables, where the multiple subtables of the second search table are in a one-to-one correspondence with the multiple search engines, and the multiple search engines include the first search engine.

The first search engine is further configured to: search, according to the second search algorithm, the second search table that can be accessed by the first search engine or the one subtable that is of the second search table and can be accessed by the first search engine, to determine whether an entry that matches the second search keyword dispatched by the global dispatcher 301 exists, to obtain a search result corresponding to the second search keyword; and output the search result corresponding to the second search keyword to the global arbiter 303.

For example, if an entry that matches the second search keyword exists in the second search table or the one subtable of the second search table, the search result may be information in the entry that matches the second search keyword, or may be information indicated by an index in the entry that matches the second search keyword. For example, the information in the entry that matches the second search keyword or the information indicated by the index in the entry that matches the second search keyword may be a next-hop IP address. The index in the entry that matches the second search keyword may be an index of the next-hop IP address. In addition, the search result may further include information used to indicate that an entry that matches the second search keyword exists in the second search table or the one subtable of the second search table. The information used to indicate that an entry that matches the second search keyword exists may be match.

For example, if an entry that matches the second search keyword does not exist in the second search table or the one subtable of the second search table, the search result may be information used to indicate that an entry that matches the second search keyword does not exist in the second search table or the one subtable of the second search table. The information used to indicate that an entry that matches the second search keyword does not exist may be miss.

The global arbiter 303 is configured to receive the search result corresponding to the first search keyword and the search result corresponding to the second search keyword.

For example, the global arbiter 303 may receive search results sent by the N search engines 302. For example, the global arbiter 303 may receive search results sent by the first search engine. The search results sent by the first search engine include the search result corresponding to the first search keyword and the search result corresponding to the second search keyword.

For example, the global arbiter 303 may arbitrate the search results sent by the N search engines 302. For specific implementation of arbitration executing by the global arbiter 303, reference may be made to the global arbiter 103 shown in FIG. 1 and the description about the global arbiter 103 in the embodiment.

Optionally, the search apparatus shown in FIG. 3 may further include a memory. The memory is configured to: before the global dispatcher 301 determines that the first search table is corresponding to the first search engine, store a correspondence between the identifier of the first search table and the identifier of the first search engine.

The global dispatcher 301 is specifically configured to determine, according to the identifier of the first search table and the correspondence between the identifier of the first search table and the identifier of the first search engine, that the first search table is corresponding to the first search engine.

Optionally, the memory is further configured to: before the global dispatcher determines that the second search table is corresponding to the first search engine, store a correspondence between the identifier of the second search table and the identifier of the first search engine.

The global dispatcher is specifically configured to determine, according to the identifier of the second search table and the correspondence between the identifier of the second search table and the identifier of the first search engine, that the second search table is corresponding to the first search engine.

Figure 4:
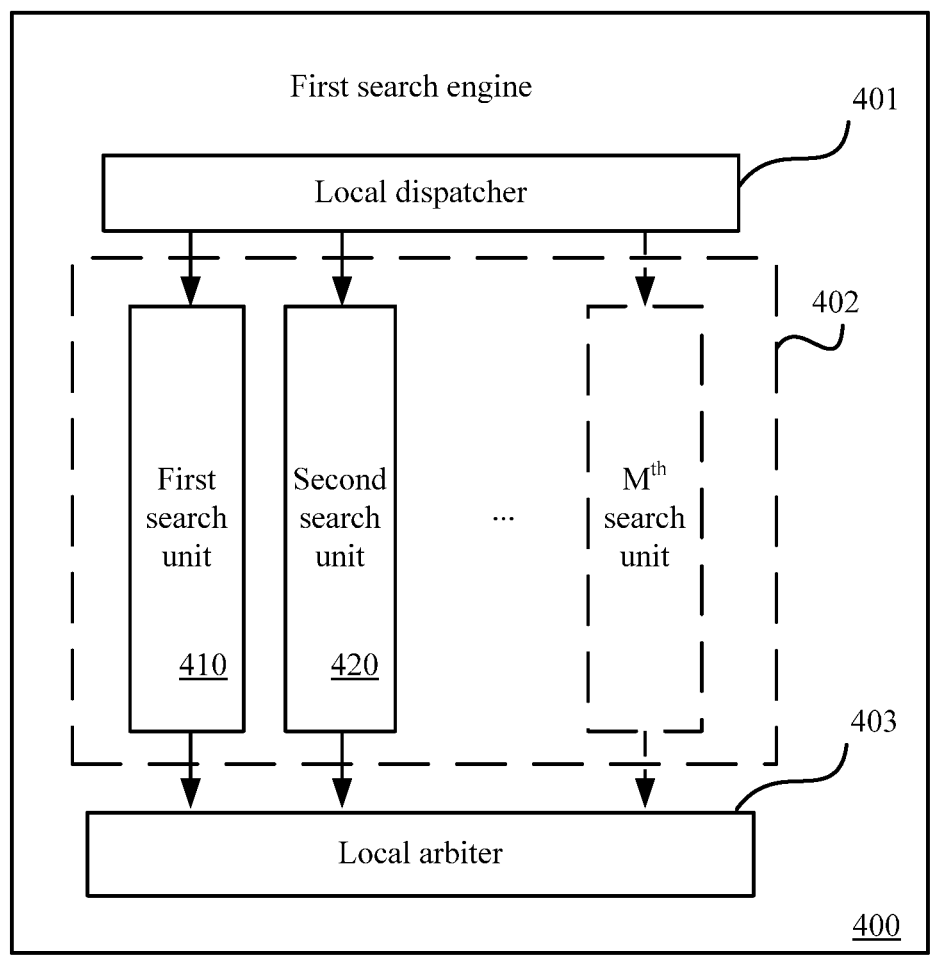
FIG. 4 is a schematic structural diagram of a first search engine according to an embodiment of this application.

Optionally, FIG. 4 is a schematic structural diagram of the first search engine shown in FIG. 3. Referring to FIG. 4, a first search engine 400 includes a local dispatcher 401, multiple search units 402, and a local arbiter 403. The multiple search units 402 include a first search unit 410 and a second search unit 420. Optionally, the multiple search units 402 may further include another search unit. The another search unit may be an $M^{th}$ search unit, where M is an integer greater than 2. The first search unit 410 can access the first search table or one subtable of the first search table. The second search unit 420 can access the second search table or one subtable of the second search table.

The local dispatcher 401 is configured to: receive the first search keyword dispatched by the global dispatcher 301, determine that the first search keyword is corresponding to the first search unit 410, and dispatch the first search keyword to the first search unit 410.

The first search unit 410 is configured to: search, according to the first search algorithm, the first search table that can be accessed by the first search unit 410 or the one subtable that is of the first search table and can be accessed by the first search unit 410, to determine whether an entry that matches the first search keyword exists; and output a search result to the local arbiter 403.

The local arbiter 403 is configured to arbitrate the search result output by the first search unit 410.

The local dispatcher 401 is further configured to: receive the second search keyword dispatched by the global dispatcher 301, determine that the second search keyword is corresponding to the second search unit 420, and dispatch the second search keyword to the second search unit 420.

The second search unit 420 is configured to: search, according to the second search algorithm, the second search table that can be accessed by the second search unit 420 or the one subtable that is of the second search table and can be accessed by the second search unit 420, to determine whether an entry that matches the second search keyword exists; and output a search result to the local arbiter 403.

The local arbiter 403 is further configured to arbitrate the search result output by the second search unit 420.

For example, architecture of at least one search unit in the multiple search units 402 is a pipeline-based SRAM. That is, the search unit may be configured in a pipeline structure. The pipeline structure includes static random access memories at multiple levels. A static random access memory at each level is configured to store a data structure of a to-be-searched table. The static random access memory at each level has a corresponding parsing unit. The parsing unit is configured to: access a data structure in the corresponding static random access memory, parse the data structure, and send a result obtained after parsing to a next-level pipeline. A search unit in a pipeline-based SRAM architecture may be configured to implement multiple types of search algorithms.

For specific implementation of arbitration executing by the local arbiter 403, reference may be made to the local arbiter 203 shown in FIG. 2 and the description about the local arbiter 203 in the embodiment.

Optionally, the N search engines 302 further include a second search engine. The first search engine can access the first search table or a first subtable of the first search table. The second search engine can access a second subtable of the first search table.

The search apparatus 300 is further configured to adjust a range of entries that can be accessed by the first search engine and a range of entries that can be accessed by the second search engine, where the range of the entries that can be accessed by the first search engine is adjusted from the first search table or the first subtable of the first search table to a third subtable of the first search table, the third subtable includes all entries, except a first entry, in the first subtable, the range of the entries that can be accessed by the second search engine is adjusted from the second subtable of the first search table to a fourth subtable of the first search table, and the fourth subtable includes all entries in the second subtable and the first entry.

The first entry may be one entry or multiple entries.

For example, a quantity of entries in the first subtable may be 100, and a quantity of entries in the second subtable may be 100. The search apparatus 300 adjusts ranges of entries that can be accessed by the N search engines 302, so that at least one entry in the first subtable is moved to the second subtable. Specifically, after the search apparatus 300 adjusts a range of entries that can be accessed by a search engine, the range of the entries that can be accessed by the first search engine is the third subtable, and the range of the entries that can be accessed by the second search engine is the fourth subtable. A quantity of entries in the third subtables may be 99, and a quantity of entries in the fourth subtables may be 101; or certainly, a quantity of entries in the third subtables may be 0, and a quantity of entries in the fourth subtables may be 200.

Figure 5:
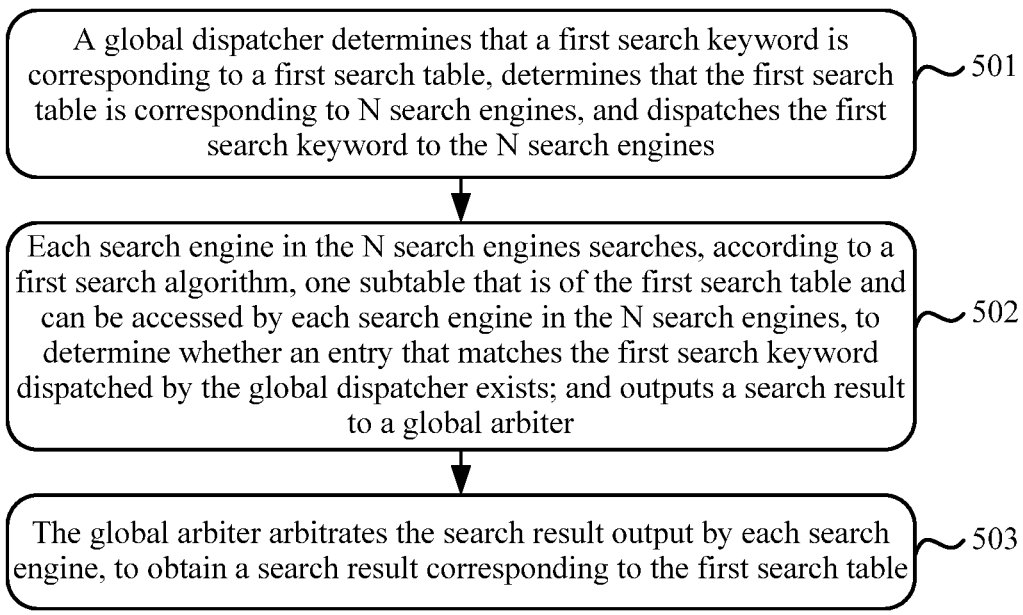
FIG. 5 is a schematic flowchart of a search method according to an embodiment of this application.

FIG. 5 is a schematic flowchart of a search method according to an embodiment of this application. The search apparatus shown in FIG. 1, FIG. 2, or FIG. 1 and FIG. 2 may be configured to execute the search method shown in FIG. 5. Referring to FIG. 5, the method includes the following steps.

501. A global dispatcher determines that a first search keyword is corresponding to a first search table, determines that the first search table is corresponding to N search engines, and dispatches the first search keyword to the N search engines.

N is an integer greater than 1, the N search engines can access the first search table, each search engine can access only one subtable of the first search table, for any two subtables N1 and N2 of the first search table, any entry in the subtable N1 is different from any entry in the subtable N2, and the first search table is corresponding to a first search algorithm.

502. Each search engine in the N search engines searches, according to the first search algorithm, the one subtable that is of the first search table and can be accessed by each search engine in the N search engines, to determine whether an entry that matches the first search keyword dispatched by the global dispatcher exists; and outputs a search result to a global arbiter.

503. The global arbiter arbitrates the search result output by each search engine, to obtain a search result corresponding to the first search table.

Optionally, in the method shown in FIG. 5, that the global dispatcher determines that the first search table is corresponding to the N search engines specifically includes: determining, according to an identifier of the first search table and a correspondence between the identifier of the first search table and identifiers of the N search engines, that the first search table is corresponding to the N search engines, where a memory stores the correspondence between the identifier of the first search table and the identifiers of the N search engines that store all subtables of the first search table.

Optionally, in the foregoing technical solution, the N search engines include at least one search engine, and the at least one search engine includes a local dispatcher, a first search unit, a second search unit, and a local arbiter. The first search unit can access one subtable of the first search table. The second search unit can access a second search table or one subtable of a second search table. The second search table is corresponding to a second search algorithm.

The method further includes: receiving, by the local dispatcher, the first search keyword dispatched by the global dispatcher, determining that the first search keyword is corresponding to the first search unit, and dispatching the first search keyword to the first search unit; searching, by the first search unit according to the first search algorithm, the one subtable that is of the first search table and can be accessed by the first search unit, to determine whether an entry that matches the first search keyword exists; and outputting a search result to the local arbiter; and arbitrating, by the local arbiter, a search result output by a search unit in the at least one search engine, and outputting an arbitration result to the global arbiter.

Optionally, in the foregoing technical solution, the N search engines include a first search engine and a second search engine. A subtable that is of the first search table and can be accessed by the first search engine is a first subtable. A subtable that is of the first search table and can be accessed by the second search engine is a second subtable.

The method further includes: adjusting ranges of entries that can be accessed by the N search engines, where the subtable that is of the first search table and can be accessed by the first search engine is adjusted to a third subtable, the third subtable includes all entries, except a first entry, in the first subtable, the subtable that is of the first search table and can be accessed by the second search engine is adjusted to a fourth subtable, and the fourth subtable includes all entries in the second subtable and the first entry.

Optionally, in the foregoing technical solution, the method further includes: sending, by the global arbiter, the search result corresponding to the first search table to the global dispatcher; storing, by the global dispatcher, a mapping relationship between the search result corresponding to the first search table and the first search keyword; and acquiring, by the global dispatcher, a second search keyword, and determining, according to the mapping relationship, stored by the global dispatcher, between the search result corresponding to the first search table and the first search keyword, that a search result corresponding to the second search keyword is the search result corresponding to the first search table, where the second search keyword is equal to the first search keyword.

The search apparatus 100 shown in FIG. 1 includes the global dispatcher 101, the N search engines 102, and the global arbiter 103. For example, the global dispatcher 101 may be configured to implement the global dispatcher mentioned in FIG. 5, the N search engines 102 may be configured to implement the N search engines mentioned in FIG. 5, and the global arbiter 103 may be configured to implement the global arbiter mentioned in FIG. 5. For meanings and specific implementation of terms involved in the method that is shown in FIG. 5 and described in the foregoing and a method expanded based on the method shown in FIG. 5, reference may be made to the embodiment corresponding to FIG. 1 and/or FIG. 2. Details are not described herein again.

Figure 6:
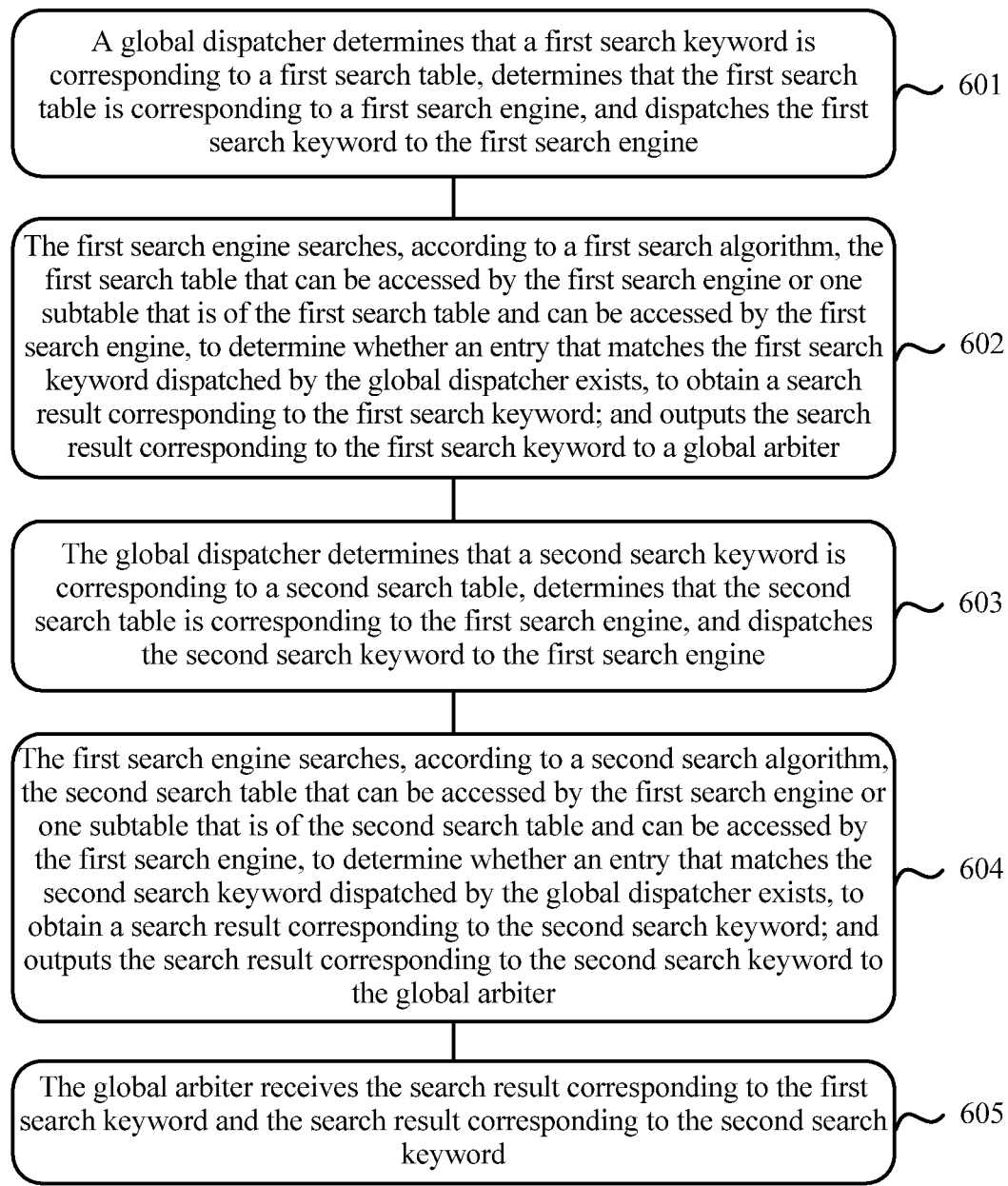
FIG. 6 is a schematic flowchart of a search method according to an embodiment of this application.

FIG. 6 is a schematic flowchart of a search method according to an embodiment of this application. The search apparatus shown in FIG. 3, FIG. 4, or FIG. 3 and FIG. 4 may be configured to execute the search method shown in FIG. 6. Referring to FIG. 6, the method includes the following steps.

601. A global dispatcher determines that a first search keyword is corresponding to a first search table, determines that the first search table is corresponding to a first search engine, and dispatches the first search keyword to the first search engine.

N search engines include the first search engine, where N is an integer greater than 1. The first search engine can access the first search table or one subtable of the first search table. The first search table is corresponding to a first search algorithm. The first search engine can access a second search table or one subtable of a second search table. The second search table is corresponding to a second search algorithm.

602. The first search engine searches, according to the first search algorithm, the first search table that can be accessed by the first search engine or the one subtable that is of the first search table and can be accessed by the first search engine, to determine whether an entry that matches the first search keyword dispatched by the global dispatcher exists, to obtain a search result corresponding to the first search keyword; and outputs the search result corresponding to the first search keyword to a global arbiter.

603. The global dispatcher determines that a second search keyword is corresponding to the second search table, determines that the second search table is corresponding to the first search engine, and dispatches the second search keyword to the first search engine.

604. The first search engine searches, according to the second search algorithm, the second search table that can be accessed by the first search engine or the one subtable that is of the second search table and can be accessed by the first search engine, to determine whether an entry that matches the second search keyword dispatched by the global dispatcher exists, to obtain a search result corresponding to the second search keyword; and outputs the search result corresponding to the second search keyword to the global arbiter.

605. The global arbiter receives the search result corresponding to the first search keyword and the search result corresponding to the second search keyword.

Optionally, the method shown in FIG. 6 further includes: before the global dispatcher determines that the first search table is corresponding to the first search engine, storing, by a memory, a correspondence between an identifier of the first search table and an identifier of the first search engine.

That the global dispatcher determines that the first search table is corresponding to the first search engine specifically includes: determining, by the global dispatcher according to the identifier of the first search table and the correspondence between the identifier of the first search table and the identifier of the first search engine, that the first search table is corresponding to the first search engine, where the identifier of the first search table and the correspondence between the identifier of the first search table and the identifier of the first search engine are stored by the memory.

Optionally, in the foregoing technical solution, the method further includes: before the global dispatcher determines that the second search table is corresponding to the first search engine, storing, by the memory, a correspondence between an identifier of the second search table and the identifier of the first search engine.

That the global dispatcher determines that the second search table is corresponding to the first search engine specifically includes: determining, by the global dispatcher according to the identifier of the second search table and the correspondence between the identifier of the second search table and the identifier of the first search engine, that the second search table is corresponding to the first search engine, where the identifier of the second search table and the correspondence between the identifier of the second search table and the identifier of the first search engine are stored by the memory.

Optionally, in the foregoing technical solution, the first search engine includes a local dispatcher, a first search unit, a second search unit, and a local arbiter. The first search unit can access the first search table or one subtable of the first search table. The second search unit can access the second search table or one subtable of the second search table.

The method further includes: receiving, by the local dispatcher, the first search keyword dispatched by the global dispatcher, determining that the first search keyword is corresponding to the first search unit, and dispatching the first search keyword to the first search unit; searching, by the first search unit according to the first search algorithm, the first search table that can be accessed by the first search unit or the one subtable that is of the first search table and can be accessed by the first search unit, to determine whether an entry that matches the first search keyword exists; and outputting a search result to the local arbiter; arbitrating, by the local arbiter, the search result output by the first search unit; receiving, by the local dispatcher, the second search keyword dispatched by the global dispatcher, determining that the second search keyword is corresponding to the second search unit, and dispatching the second search keyword to the second search unit; searching, by the second search unit according to the second search algorithm, the second search table that can be accessed by the second search unit or the one subtable that is of the second search table and can be accessed by the second search unit, to determine whether an entry that matches the second search keyword exists; and outputting a search result to the local arbiter; and arbitrating, by the local arbiter, the search result output by the second search unit.

Optionally, in the foregoing technical solution, the N search engines further include a second search engine. The first search engine can access the first search table or a first subtable of the first search table. The second search engine can access a second subtable of the first search table.

The method further includes: adjusting a range of entries that can be accessed by the first search engine and a range of entries that can be accessed by the second search engine, where the range of the entries that can be accessed by the first search engine is adjusted from the first search table or the first subtable of the first search table to a third subtable of the first search table, the third subtable includes all entries, except a first entry, in the first subtable, the range of the entries that can be accessed by the second search engine is adjusted from the second subtable of the first search table to a fourth subtable of the first search table, and the fourth subtable includes all entries in the second subtable and the first entry.

The search apparatus 300 shown in FIG. 3 includes the global dispatcher 301, the N search engines 302, and the global arbiter 303. For example, the global dispatcher 301 may be configured to implement the global dispatcher shown in FIG. 6, the N search engines 302 may be configured to implement the N search engines shown in FIG. 6, and the global arbiter 303 may be configured to implement the global arbiter shown in FIG. 6. For meanings and specific implementation of terms involved in the method that is shown in FIG. 6 and described in the foregoing and a method expanded based on the method shown in FIG. 6, reference may be made to the embodiment corresponding to FIG. 3 or FIG. 4. Details are not described herein again.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division may be merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to execute all or some of the steps of the methods described in the embodiments of the present invention. The foregoing storage medium includes: any medium that can store program code, such as a USB flash drive, a removable hard disk, a read-only memory (English: read-only memory, ROM for short), a random access memory (English: random access memory, RAM for short), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An apparatus, comprising:
a chip, configured to implement a first search engine and a second search engine;
wherein the first search engine is configured to:
receive a first search request associated with packet forwarding;
in response to receiving the first search request, search a first subtable using a first algorithm, wherein the first subtable is a portion of a first search table, wherein the first search table is associated with the first algorithm, and wherein the first subtable is searchable by the first search engine and the first subtable is not searchable by the second search engine; and
output a result of searching the first subtable; and
wherein the second search engine is configured to:
receive a second search request associated with packet forwarding;
in response to receiving the second search request, search a second subtable using a second algorithm, wherein the second subtable is a portion of a second search table, wherein the second search table is associated with the second algorithm, wherein the second subtable is searchable by the second search engine and the second subtable is not searchable by the first search engine, and wherein the first algorithm is different from the second algorithm; and output a result of searching the second subtable; and wherein the chip is an application-specific integrated circuit (ASIC) or a field programmable gate array (FPGA).

2. The apparatus of claim 1, wherein the first search table and the second search table respectively correspond to different search keywords.

3. The apparatus of claim 1, wherein the first search table is different from the second search table.

4. The apparatus of claim 1, wherein a search keyword used for the first search table is an internet protocol (IP) destination address of a packet.

5. The apparatus of claim 1, wherein a search keyword used for the second search table is a media access control (MAC) destination address of a packet.

6. The apparatus of claim 1, wherein the first algorithm is a longest prefix search algorithm, a linear search algorithm, an exact search algorithm, or a mask search algorithm.

7. The apparatus of claim 6, wherein the second algorithm is a longest prefix search algorithm, a linear search algorithm, an exact search algorithm, or a mask search algorithm.

8. The apparatus of claim 1, wherein the first search table is an access control list (ACL), a routing table, an incoming label map (ILM) table, a MAC protocol table, or a queue management (QM) table.

9. The apparatus of claim 8, wherein the second search table is an access control list (ACL), a routing table, an incoming label map (ILM) table, a MAC protocol table, or a queue management (QM) table.

10. The apparatus of claim 1, wherein the first subtable and the second subtable are stored in the chip.

11. The apparatus of claim 10, wherein the first subtable is stored in the first search engine, and the second subtable is stored in the second search engine.

12. The apparatus of claim 1, wherein the first search table comprises a third subtable, the third subtable is searchable by a third search engine, and the third subtable is not searchable by a fourth search engine, and wherein the second search table comprises a fourth subtable, the fourth subtable is searchable by the fourth search engine, and the fourth subtable is not searchable by the third search engine.

13. The apparatus of claim 1, wherein the apparatus comprises circuitry that implements performing arbitration based on a first search result of the first search engine and a second search result of the second search engine.

14. The apparatus of claim 1, wherein the apparatus comprises circuitry that implements:
   determining a first search keyword associated with a first packet;
   determining, based on the first search keyword, the first search engine for the first search keyword;
   sending the first search request to the first search engine;
   determining a second search keyword associated with a second packet;
   determining, based on the second search keyword, the second search engine for the second search keyword; and
   sending the second search request to the second search engine.

15. A method, comprising:
   receiving, by a first search engine implemented by a chip, a first search request associated with packet forwarding; and in response to receiving the first search request, searching, by the first search engine, a first subtable using a first algorithm, wherein the first subtable is a portion of a first search table, wherein the first search table is associated with the first algorithm, and wherein the first subtable is searchable by the first search engine and the first subtable is not searchable by a second search engine implemented by the chip;
   outputting, by the first search engine, a result of searching the first subtable;
   receiving, by the second search engine, a second search request associated with packet forwarding;
   in response to receiving the second search request, searching, by the second search engine, a second subtable using a second algorithm, wherein the second subtable is a portion of a second search table, wherein the second search table is associated with the second algorithm, wherein the second subtable is searchable by the second search engine and the second subtable is not searchable by the first search engine, and wherein the first algorithm is different from the second algorithm; and
   outputting, by the second search engine, a result of searching the second subtable.

16. The method of claim 15, wherein the first search table and the second search table respectively correspond to different search keywords.

17. The method of claim 15, wherein the first search table is different from the second search table.

18. The method of claim 15, wherein a search keyword used for the first search table is an internet protocol (IP) destination address of a packet.

19. The method of claim 15, wherein a search keyword used for the first search table is a media access control (MAC) destination address of a packet.

20. The method of claim 15, wherein the first algorithm is a longest prefix search algorithm, a linear search algorithm, an exact search algorithm, or a mask search algorithm.

21. The method of claim 20, wherein the second algorithm is a longest prefix search algorithm, a linear search algorithm, an exact search algorithm, or a mask search algorithm.

22. The method of claim 15, wherein the first search table is an access control list (ACL), a routing table, an incoming label map (ILM) table, a MAC protocol table, or a queue management (QM) table.

23. The method of claim 22, wherein the second search table is an access control list (ACL), a routing table, an incoming label map (ILM) table, a MAC protocol table, or a queue management (QM) table.

24. The method of claim 15, wherein the first subtable and the second subtable are stored in the chip.

25. The method of claim 24, wherein the first subtable is stored in the first search engine, and the second subtable is stored in the second search engine.

26. The method of claim 15, wherein the first search table comprises a third subtable, the third subtable is searchable by a third search engine, and the third subtable is not searchable by a fourth search engine, and wherein the second search table comprises a fourth subtable, the fourth subtable is searchable by the fourth search engine, and the fourth subtable is not searchable by the third search engine.

27. The method of claim 15, wherein the chip is an application-specific integrated circuit (ASIC) or a field programmable gate array (FPGA).

28. The method of claim 15, further comprising:
performing arbitration based on a first search result of the first search engine and a second search result of the second search engine.

29. The method of claim 15, further comprising:
determining a first search keyword associated with a first packet;
determining, based on the first search keyword, the first search engine for the first search keyword;
sending the first search request to the first search engine;
determining a second search keyword associated with a second packet;
determining, based on the second search keyword, the second search engine for the second search keyword; and
sending the second search request to the second search engine.

30. A chip, comprising:
a first search engine; and
a second search engine;
wherein the first search engine is configured to:
  receive a first search request associated with packet forwarding;
  in response to receiving the first search request, search a first subtable using a first algorithm, wherein the first subtable is a portion of a first search table, wherein the first search table is associated with the first algorithm, and wherein the first subtable is searchable by the first search engine and the first subtable is not searchable by the second search engine; and
  output a result of searching the first subtable; and
wherein the second search engine is configured to:
  receive a second search request associated with packet forwarding;
  in response to receiving the second search request, search a second subtable using a second algorithm, wherein the second subtable is a portion of a second search table, wherein the second search table is associated with the second algorithm, wherein the second subtable is searchable by the second search engine and the second subtable is not searchable by the first search engine, and wherein the first algorithm is different from the second algorithm; and
  wherein the chip is an application-specific integrated circuit (ASIC) or a field programmable gate array (FPGA); and
  output a result of searching the second subtable.

31. The chip of claim 30, wherein the first search table and the second search table respectively correspond to different search keywords.

32. The chip of claim 30, wherein the first search table is different from the second search table.

33. The chip of claim 30, wherein a search keyword used for the first search table is an internet protocol (IP) destination address of a packet.

34. The chip of claim 30, wherein a search keyword used for the second search table is a media access control (MAC) destination address of a packet.

35. The chip of claim 30, wherein the first algorithm is a longest prefix search algorithm, a linear search algorithm, an exact search algorithm, or a mask search algorithm.

36. The chip of claim 35, wherein the second algorithm is a longest prefix search algorithm, a linear search algorithm, an exact search algorithm, or a mask search algorithm.

37. The chip of claim 30, wherein the first search table is an access control list (ACL), a routing table, an incoming label map (ILM) table, a MAC protocol table, or a queue management (QM) table.

38. The chip of claim 37, wherein the second search table is an access control list (ACL), a routing table, an incoming label map (ILM) table, a MAC protocol table, or a queue management (QM) table.

39. The chip of claim 30, wherein the first subtable and the second subtable are stored in the chip.

40. The chip of claim 39, wherein the first subtable is stored in the first search engine, and the second subtable is stored in the second search engine.

41. The chip of claim 30, wherein the first search table comprises a third subtable, the third subtable is searchable by a third search engine, and the third subtable is not searchable by a fourth search engine, and wherein the second search table comprises a fourth subtable, the fourth subtable is searchable by the fourth search engine, and the fourth subtable is not searchable by the third search engine.

* * * * *